US011531962B2

(12) United States Patent
Richardson et al.

(10) Patent No.: US 11,531,962 B2
(45) Date of Patent: *Dec. 20, 2022

(54) INVENTORY MANAGEMENT SYSTEM (71) Applicant: Ellsworth Corporation, Germantown, WI (US)

(72) Inventors: Jeremy Richardson, Delaware, OH (US); Christina Gabrielson, Germantown, WI (US); James Hazen, Menomonee Falls, WI (US); Randall T. Witt, Hartford, WI (US)

(73) Assignee: Ellsworth Corporation, Germantown, WI (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/235,513

(22) Filed: Apr. 20, 2021

(65) Prior Publication Data
US 2021/0241218 A1    Aug. 5, 2021

Related U.S. Application Data (63) Continuation of application No. 15/767,278, filed as application No. PCT/US2016/056821 on Oct. 13, 2016, now Pat. No. 11,010,710.

(60) Provisional application No. 62/240,711, filed on Oct. 13, 2015.

(51) Int. Cl.
*G06Q 10/08* (2012.01)
*H04W 4/80* (2018.01)
*G06Q 30/02* (2012.01)
*H04W 4/029* (2018.01)

(52) U.S. Cl.
CPC .......... *G06Q 10/087* (2013.01); *G06Q 10/08* (2013.01); *H04W 4/80* (2018.02); *H04W 4/029* (2018.02)

(58) Field of Classification Search
CPC ....... G06Q 10/087; G06Q 10/08; H04W 4/80; H04W 4/029; H04W 4/02
USPC ......................................................... 705/28
See application file for complete search history.

(56) References Cited

U.S. PATENT DOCUMENTS

| 11,010,710 | B2 | 5/2021 | Richardson et al. |
| 2005/0149387 | A1* | 7/2005 | O'Shea .................. G06Q 30/02 705/14.17 |
| 2005/0149414 | A1 | 7/2005 | Schrodt et al. |
| 2008/0174432 | A1 | 7/2008 | Ulrich |

(Continued)

*Primary Examiner* — Garcia Ade
(74) *Attorney, Agent, or Firm* — Reinhart Boerner Van Deuren P.C.

(57) ABSTRACT

An inventory management system includes one or more radio frequency identification (RFID) readers each configured to detect RFID labels attached to inventory items within a certain radius of the RFID reader. The one or more RFID readers are configured to automatically determine a directional movement of RFID labels and attached inventory items. A first computer server is configured to communicate, via a network connection, with one or more client devices, and also configured to receive data gathered by the one or more RFID readers. The first computer server is configured to maintain a real-time inventory status of the inventory items. The real-time inventory status includes a location of the one or more RFID labels, and further includes a current usage state of the attached inventory items. The first computer server is configured to transmit the real-time inventory status to a display of the client device.

26 Claims, 5 Drawing Sheets

(56) References Cited

U.S. PATENT DOCUMENTS

| | | |
|---|---|---|
| 2010/0022221 A1 | 1/2010 | Yi et al. |
| 2010/0138281 A1 | 6/2010 | Zhang et al. |
| 2014/0344118 A1* | 11/2014 | Parpia .................. G06Q 10/087 |
| | | 705/28 |

* cited by examiner

| Push Time 1/20/2015 5:14:28PM | PortalEventViewer V6.0.1303.7 | IP Name: ALAN_ELLSWORTH | |
|---|---|---|---|
| | Description | | QTY |
| | 94 Badge# 00184 Justin Brady, Production QA, Plexus | | |
| | PLEXUS_STORAGE | Top LH | 1 |
| | PLIOBOND 20 5 GALLON PAIL PLIOBIND 20 5 Gallon Pail | | |
| | PLEXUS_STORAGE | Top LH | 1 |
| | 77 SUPER SPRAY 5GL PL Super 77 Spray Adhesive 5 Gallon Pail | | |
| | PLEXUS_STORAGE | Top LH | 2 |

Assets: 0   Employees: 1   Products: 3

Menu                              Accept | Reject

TagNet

INVENTORY MANAGEMENT SYSTEM

CROSS-REFERENCE TO RELATED PATENT APPLICATION

This patent application is a continuation of U.S. patent application Ser. No. 15/767,278, filed Apr. 10, 2018, which is a 371 nationalization of International Application No. PCT/US2016/056821, filed. Oct. 13, 2016, which claims the benefit of U.S. Provisional Patent Application No. 62/240,711, filed Oct. 13, 2015, the entire teachings and disclosures of which are incorporated herein by reference thereto.

FIELD OF THE INVENTION

This invention generally relates to a system for inventory management.

BACKGROUND OF THE INVENTION

Inventory management is an important function in many large organizations both public and private. Often, the ability to successfully manage inventory is critical to the efficient operation of the organization. As such, many aspects of management theory deal with various systems and methods for managing and controlling inventory.

Embodiments of the present invention represent an advancement over the state of the art with respect to inventory management systems. These and other advantages of the invention, as well as additional inventive features, will be apparent from the description of the invention provided herein.

BRIEF SUMMARY OF THE INVENTION

In one aspect, embodiments of the invention provide an inventory management system that includes one or more radio frequency identification (RFID) readers with each configured to detect RFID labels attached to inventory items within a certain radius of the RFID reader. The one or more RFID readers are configured to automatically determine a directional movement of RFID labels and attached inventory items. A first computer server is configured to communicate, via a network connection, with one or more client devices, and also configured to receive data gathered by the one or more RFID readers. The first computer server is configured to maintain a real-time inventory status of the inventory items. The real-time inventory status includes a location of the one or more RFID labels, and further includes a current usage state of the attached inventory items. The first computer server is configured to transmit the real-time inventory status to a display of the client device. In some embodiments, the inventory management system includes an RFID label printer configured to print RFID labels for the inventory items.

In a particular embodiment, the client device includes a second computer server configured as a slave to the first computer server, the second computer server connected to the one or more RFID readers. The client device may also include a handheld RFID scanner. In other embodiments, the client device includes a thick-client-managed RFID scanner. In particular embodiments, the thick client is one of a desktop computer, a laptop computer, and a tablet computer. The client devices, in some cases, include an application to facilitate the display the real-time inventory status. In some embodiments, the application facilitates the display of a photograph of the inventory item associated with a particular RFID label, along with the location of the RFID label and the current usage state of the inventory item. In a further embodiment, the application updates the display of the real-time inventory status in real-time based on data gathered by the RFID reader.

In certain embodiments, each of the one or more RFID readers is located at a portal or doorway. In some instances, the portal is a dual zone portal having RFID readers located on each side of the portal, such that the RFID readers can determine the direction an RFID label moves through the portal. In alternate embodiments, the portal is a single zone portal having RFID readers located on one side of the portal.

The first computer server may be programmed to implement a dwell time such that, after a change in the current usage state of the inventory item due to detection of the inventory item's RFID label by a particular RFID reader, the current usage state cannot be changed again, during the dwell time, based on a subsequent detection of the inventory item's RFID label by the particular RFID reader.

In certain embodiments, the first computer server is configured to detect an RFID label carried by an individual in order to identify and record a name of the individual transporting the inventory items. Further, the first computer server may be configured to determine the current usage state of inventory items by the directional movement of the RFID labels attached to the inventory items. In some embodiments, the first computer server is configured to track a shelf life for each inventory item.

In particular embodiments of the invention, prior to shipment of the inventory items, RFID labels on each inventory item are linked to items listed on the packing slip. In this embodiment, the first computer server is configured to automatically determine whether the RFID labels on each inventory item detected by the one or more RFID readers matches the listing of inventory items on the packing slip.

In a particular embodiment, each location includes a unique RFID label such that a physical count of the inventory items in a location can be performed by scanning the RFID label for the location and for each inventory item in that location. The first computer server may be configured to detect, in real time, a discrepancy between the physical count and a projected inventory count. In some embodiments, the first computer server loads, onto a handheld RFID scanner for storage thereon, the projected count for the inventory item at the location for comparison to the physical count determined by the handheld RFID scanner.

In certain embodiments, the first computer server is remotely-located from the one or more client devices. Additionally, the first computer server may be configured to control one or more remotely-located RFID readers. In such an embodiment, the client device may be a thin client used at the remote location to access the real-time inventory status. The thin client may be one of a tablet computer, touch screen device, notebook computer, and a smart phone.

In some embodiments, the first computer server is configured to maintain a real-time inventory status of the inventory items from one or more remote sites. The first computer server may be configured to include an application which automatically generates replenishment orders for inventory items when an inventory level for the inventory item drops below a threshold level.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, Modifications and equivalents as included within the spirit and scope of the invention as defined by the appended claims.

DETAILED DESCRIPTION OF THE INVENTION

Figure 1A:
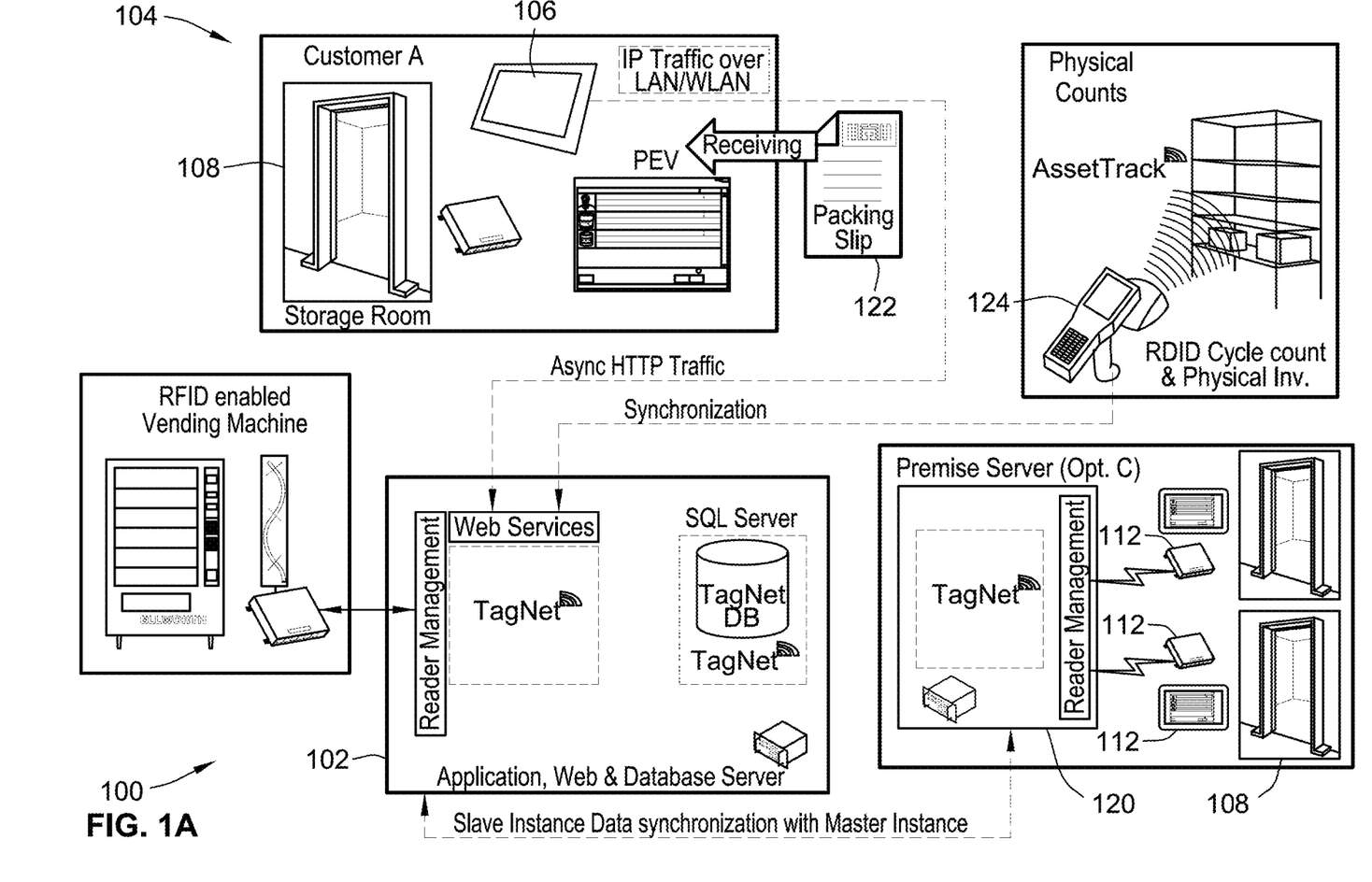
FIGS. 1A and 1B are schematic block diagrams illustrating an inventory management system, according to an embodiment of the invention.
Figure 1B:
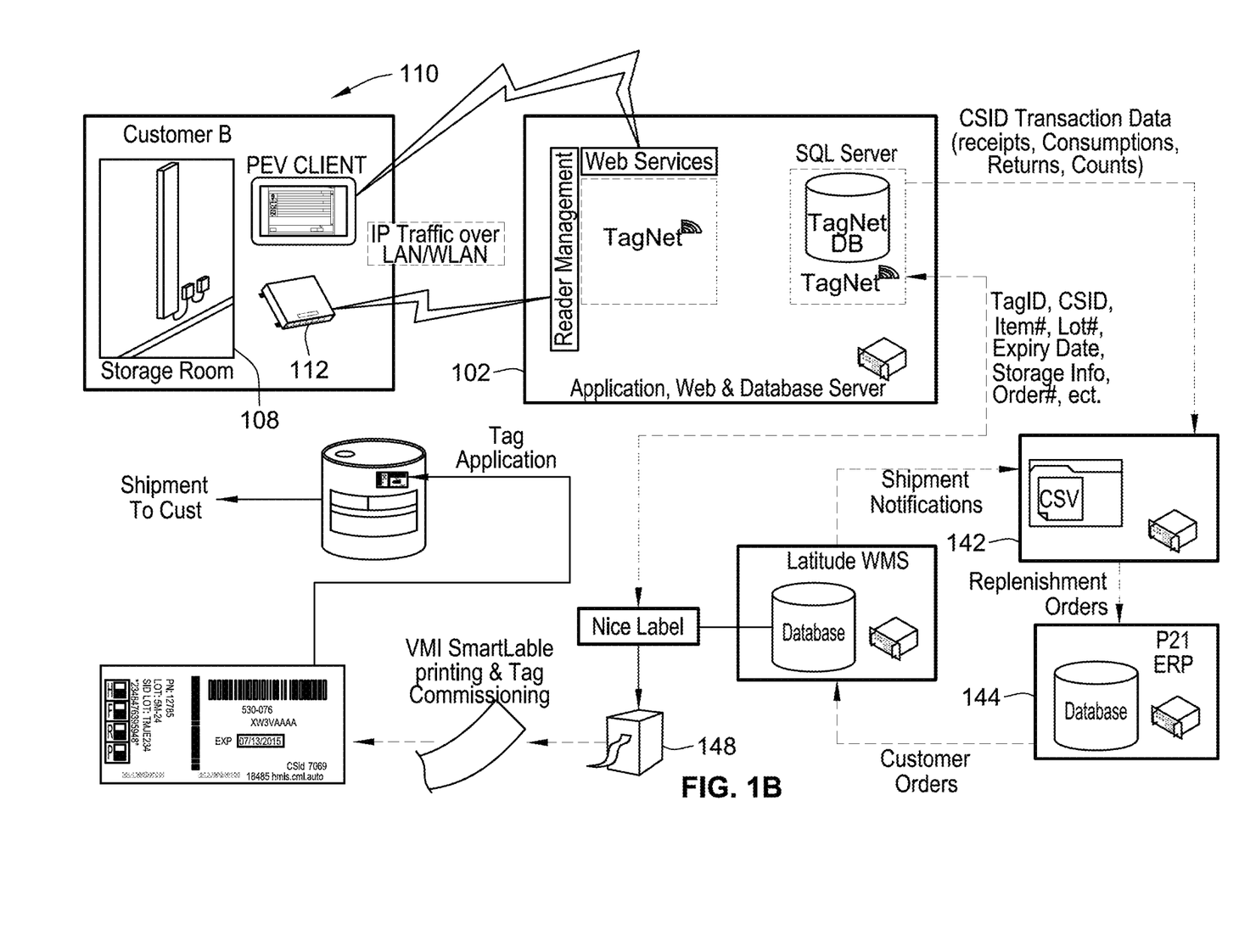

FIGS. 1A and 1B are schematic block diagrams illustrating a server-based inventory management system 100, constructed in accordance with an embodiment of the invention. The inventory management system 100 includes a computer server 102 having a database for the storage of inventory information, which typically includes a location of the inventory item and the current usage state of the inventory item. Information on inventory type, movement, and levels is acquired substantially via the scanning of RFID labels by strategically located RFID readers 108.

The computer server 102 is configured to communicate, via wired or wireless means, with a variety of client devices. The client devices include, but are not limited to, desktop computers, laptop computers, tablet computers, and handheld RFID scanners. FIGS. 1A and 1B illustrate three possible user configurations. The first user configuration 104 is a wired connection to a thick client 106, which could be a desktop computer or a laptop computer. As with any of the user configurations described herein, the user may be remotely located from the computer server 102. The thick client 106 is configured to provide a user with a high degree of functionality, with respect to management and control of RFID readers 108, along with access and manipulation of inventory data, independent of the computer server 102. Data from the thick client 106 may be deployed to one or more thin clients 112, such as tablet computers, touch screen devices, notebook computers, or smart phones, etc., to allow multiple users access to real-time inventory data which may be stored on the computer server 102, thick client 106, or both.

The second user configuration 110 is one in which the computer server 102 manages and controls the RFID readers 108 via a wired or wireless connection. At the user site, thin clients 112, such as the aforementioned tablet computers, touch screen devices, notebook computers, or smart phones, may be used to access to real-time inventory data which may be stored on the computer server 102.

In a third user configuration 116, the computer server 102 communicates, via a wired connection, with a client server 120 remotely located from the computer server 102. The client server 120 is configured as a slave server to the computer server 102, and is also configured to manage and control the RFID readers 108 at the user site. The client server 120 locally provides all, or nearly all, of the functions provided by the computer server 102. The client server 120 is also configured for wireless communication with thin clients 112, such as the aforementioned tablet computers, touch screen devices, notebook computers, or smart phones that allow for access to real-time inventory data stored on the client server 120.

Figure 2:
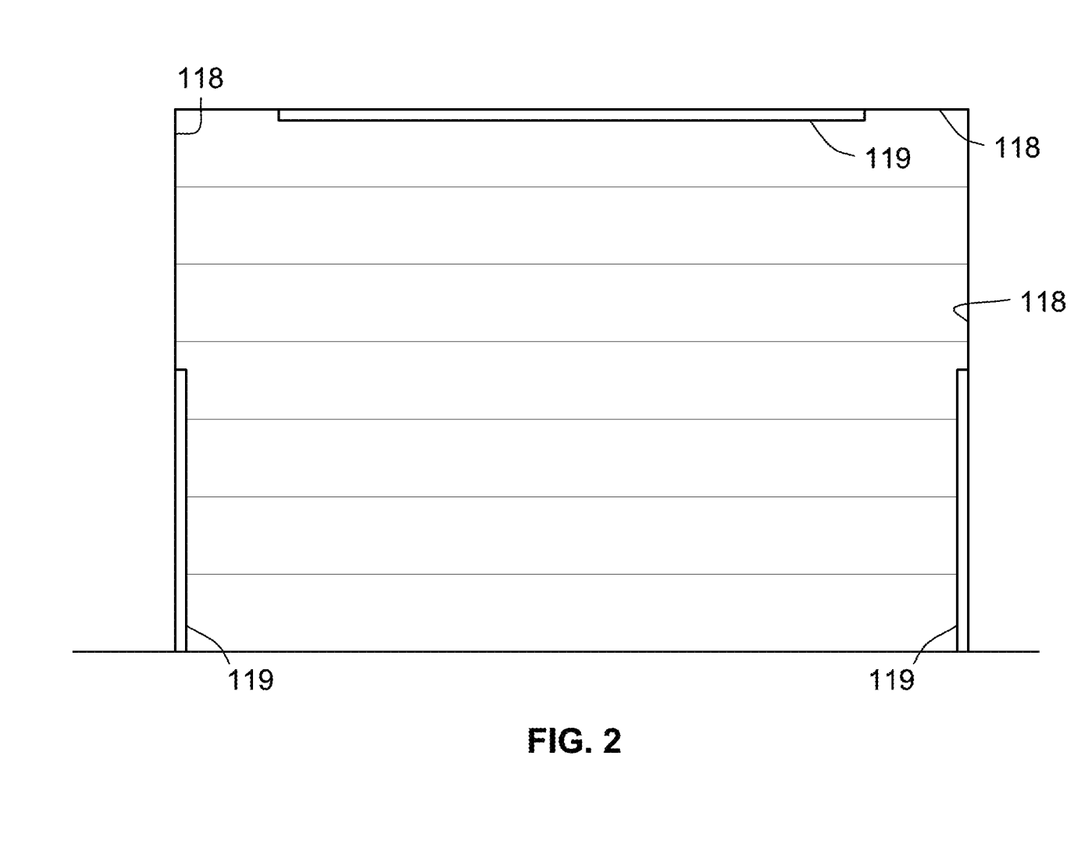
FIG. 2 is a perspective view of an RFID portal, in accordance with an embodiment of the invention.

FIG. 2 is a perspective view of an RFID portal that incorporates one or more RFID readers 118, in accordance with an embodiment of the invention. An RFID portal includes one or more RFID antennas 119 (managed by an RFID reader 118) installed at a given chokepoint such as a doorway, hallway or anywhere where tagged items (with RFID labels) pass through. An exemplary portal is shown in FIG. 2 as a vertically opening bay door such as might be found on the loading dock of a warehouse or factory building. RFID readers 118 are installed on each side, and along the top, of the bay door. However, RFID portals can be installed in a variety of different locations with a variety of different RFID reader 118 arrangements. The more RF signal emitted at the portal (e.g., more antennas 119 and higher power), the better overall readability at the portal. Typically, some care must be taken to ensure that the RF signal is controlled and does not bleed over into other inventory areas.

When an RFID label, attached to an inventory item and known to the computer server 102, passes through a given RFID portal and is recognized by the RFID reader 118, the current inventory location of the inventory item is assessed, and based on the status of the inventory item in the computer server 102, the inventory location is updated. When the inventory item is seen again by the RFID reader 118 that same logic is applied. These rules are configured in the computer server's 102 inventory movement rules and enables users to maintain a perpetual inventory state of tagged items as they move throughout the enterprise. It should be noted that the term "inventory item" can be applied to a wide variety of goods. In this context, any good that can be fitted with an RFID label, which includes any number of manufactured items, soft goods, but also includes chemicals, various liquids in containers, etc.

The computer server 102 may be configured to designate the inventory location of a tagged item as "in-transit" during shipment from one location to another. When the tagged inventory item is received at a user site, a warehouse for example, the inventory movement rules in the computer server 102 may change the inventory location from "in-transit" to "storage". When the RFID label is read again by an RFID reader 118, the current inventory location may be changed from "storage" to "consumed" if the RFID reader 118 indicates that the inventory item was moved from a storage area to a production area. In certain embodiment, it is desirable to have a "dwell time" or period in-between read events so that a given RFID label has time to move away from the portal (e.g., to be put-away on shelf, etc.) before it is considered for another inventory move. The dwell time should be long enough to allow the RFID label to move away from the portal read zone, but not too long such that, if it is brought back into the range of the RFID reader 118 relatively quickly, it will be not be ignored. For example, if the tagged inventory item is inadvertently seen after the dwell time (e.g., after put-away operation), it could erroneously be considered as leaving the area and the inventory location changed to an incorrect location.

RFID readers 118 may be arranged at a portal to provide directional awareness. Directional awareness is when there are two read zones (i.e., dual zone), and thus two or more RFID readers 118, on each side of a choke point (e.g., a doorway threshold) and thus the computer server 102 can deduct when a RFID label is coming or going (not just that it was seen). This logic basically looks at which RFID reader 118 saw the RFID label last (e.g., 1-2 or 2-1), and, based on that reading, executes the appropriate inventory movement rules. In this case, a dwell period is not required as with a single-zone portal (described above) and tagged inventory items can come and go at any point (e.g. back to back, reverse direction, etc.).

The end result of implementing the inventory movement rules, as explained above, is that the computer server 102 maintains a real-time perpetual inventory of tagged inventory items. This can be seen in the computer server 102 inventory inquiry that shows a concise picture of inventory state and all the supporting event transactions. The computer server 102 provides, to the display of a local or remotely located client device, real-time data on the inventory status, including location, current usage state, shelf life, storage time, etc. The current usage state may include information on the process in which the inventory item is being used. The location information can be arranged to have an enterprise view so that a given user can be selected, and below that information level there can be a listing of different usage states (e.g. staging, storage, consumed, etc.).

In particular embodiments, the server-based inventory management system 100 allows for the transport of tagged items through the RFID portal such that users are able to visualize/verify what has actually been scanned by the RFID reader 118. The computer server 102 provides a client application called a portal event viewer (PEV) that is configured with the computer server 102 on a subscription basis to facilitate display of real-time inventory status information. RFID labels being read at a given portal can be pushed to one or more PEV clients. The PEV will then display key information like the item image and key descriptors so the inventory item can be easily identified as being "read".

Figure 3:
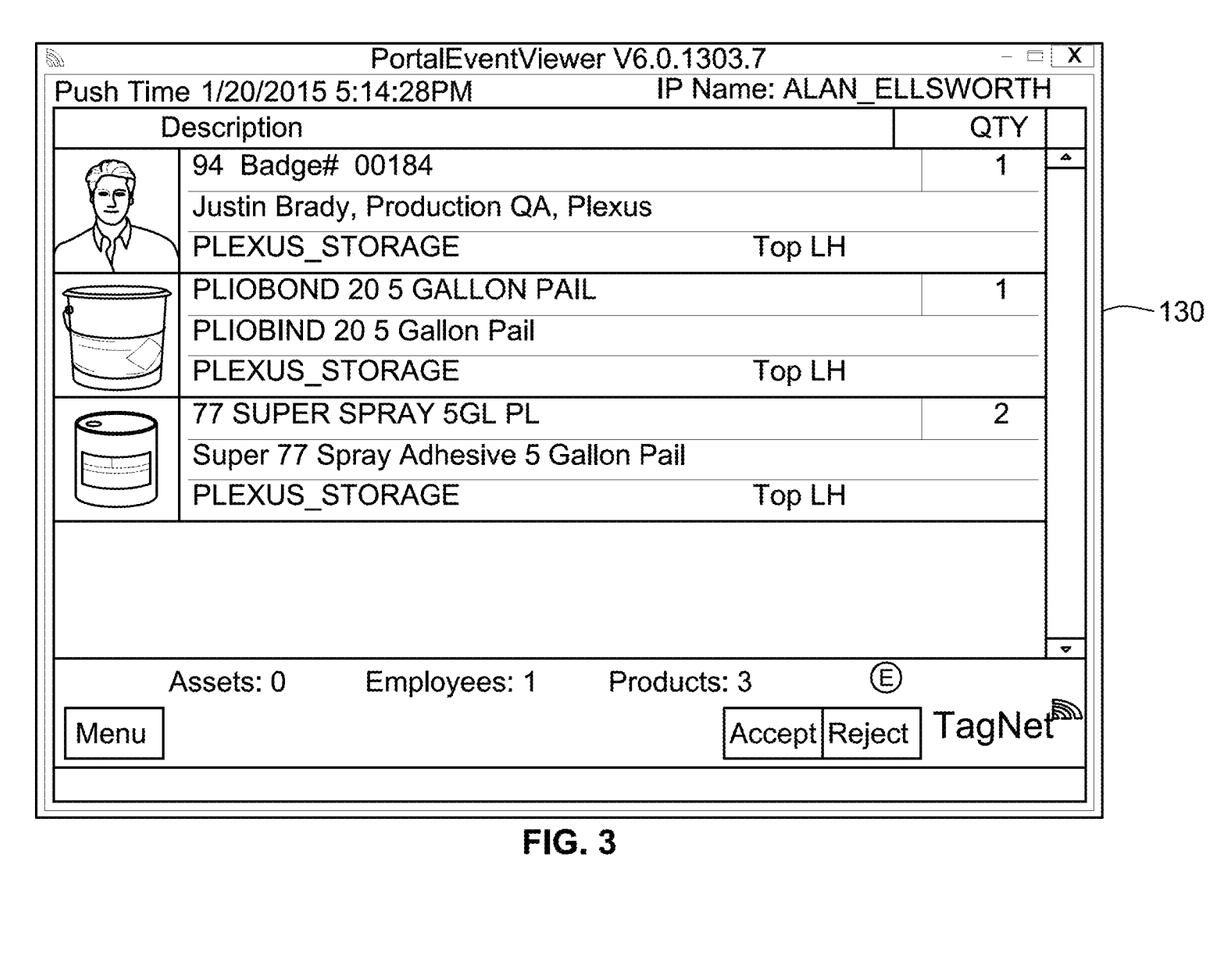
FIG. 3 is a schematic diagram showing an exemplary screen shot for a portal event viewer, according to an embodiment of the invention.

FIG. 3 is a schematic diagram showing an exemplary screen shot 130 for a portal event viewer, according to an embodiment of the invention. The PEV application facilitates the display of a photograph of the inventory item associated with a particular RFID label, along with the location of the RFID label and the current usage state of the inventory item. In a further embodiment, the application updates the display of the real-time inventory status in real-time based on data gathered by the RFID reader.

Given the factors that can influence RFID label readability, visualizing the RFID labels may have a lesser or greater importance to the user. The RFID label could be missed during passage, or an additional RFID label not physically transported could be inadvertently seen (e.g., a rogue read event). If an inventory item is missed, it can simply be moved back into the RFID portal area until the RFID label is recognized by the RFID reader 118, and the event is pushed to the PEV.

There are two modes of PEV operation 1) attended and 2) unattended as explained below:

Unattended—as the tagged inventory items are seen at the RFID portal, the computer server's 102 movement rules are processed, and, when they appear on the PEV, it is for confirmation purposes only as the inventory transaction has already taken place. In this embodiment, dropping an RFID label from the PEV display will not nullify or reverse the transaction.

Attended—as the tagged inventory items are seen at the RFID portal, the RFD label is resolved to the item and is displayed on the PEV. No inventory movement rules have been implemented by the computer server 102 at this point. The user can verify that all of the RFID labels have been read (including dropping any unwanted RFID labels) and then accept the transaction which will then execute the inventory transaction and appropriate inventory movement rules.

In particular embodiments of the invention, prior to shipment of the inventory items, a packing slip 122 (see FIG. 1A) with a packing slip RFID label is linked to the RFID labels on each inventory item listed on the packing slip 122. In this embodiment, the computer server 102 is configured to automatically determine whether the RFID labels on each inventory item, detected by the RFID readers 118 at the receiving location, matches the listing of inventory items on the packing slip 122.

The user would validate the goods/inventory items received against the packing slip. Even if the goods actually received do not match those on the packing slip, the user would transport the tagged inventory items physically received through the RFID portal into storage. The computer server 102 would record the transaction as the inventory items are physically moved into storage (normal the computer server 102 operation) and could happen over several passes relative to the amount of material being received to inventory.

The computer server 102 is configured to perform a consumption transaction in a similarly straightforward manner. As tagged inventory items are moved out of the storage area and scanned at the RFID portal, the inventory items would then be assigned a usage state of "consumed". The computer server 102 can also execute a return transaction in a fairly straightforward manner. As tagged inventory items are returned to the storage area and scanned at the RFID portal, the inventory items would then be assigned usage state of "storage" if their previous usage state was "consumed". The inventory location would be appropriately updated as well.

In a particular embodiment, each location within a user facility includes a unique RFID label, such that a physical count of the inventory items in a location can be performed by scanning the RFID label for the location and for each inventory item in that location. The computer server 102 may be configured to detect, in real time, a discrepancy between the physical count and a projected inventory count. In some embodiments, the computer server 102 loads, onto a handheld RFID scanner 124 (see FIG. 1A) for storage thereon, the projected count for the inventory item at the location for comparison to the physical count determined by the handheld RFID scanner 124.

In at least one embodiment, the computer server 102 includes a physical inventory module that works offline so that no Wi-Fi or cellular data communications are required during the actual counting operation. The computer server 102 can be directed to any user location for the physical count. The inventory data will then be synchronized onto the handheld RFID scanner 124 and the inventory data can be transmitted to the user location for a physical count. RFID location tags can be mounted in each inventory storage area, and each location tag represents a unique location for inventory storage. These locations are stored in the computer server 102 and associated with inventory items at that location (e.g., "User 100/Room 1") during physical counts, for example. In certain embodiments, when the RFID location tag is scanned by the RFID reader 118, the handheld RFID scanner 124 will display how many inventoried items are expected in that program location (the perpetual count). The handheld RFID scanner 124 will then proceed to scan all the tagged items in that area while at same time comparing the projected amount to the physical count.

The computer server 102 may also be configured to detect an RFID label carried by an individual in order to identify and record a name of the individual transporting the inventory items. Thus, a record is created showing the name, date, time, and possibly even a photograph of the individual transporting the inventory items through a given RFID portal. As can be seen in FIG. 2, this real-time inventory information may be made available via the portal event viewer to users accessing the computer server 102 using thin clients 112.

Additionally, a fourth user configuration involves the use of one or more handheld RFID scanners 124 wirelessly connected to the computer server 102. When the computer server 102 is remotely located, the one or more handheld RFID scanners 124 may be managed and controlled by a local thick client 106, local slave server 120, or may be controlled by the computer server 102. Handheld RFID scanners 124 are convenient for physical counts, and may be used in the place of fixed portal-based RFID readers 118.

Figure 4:
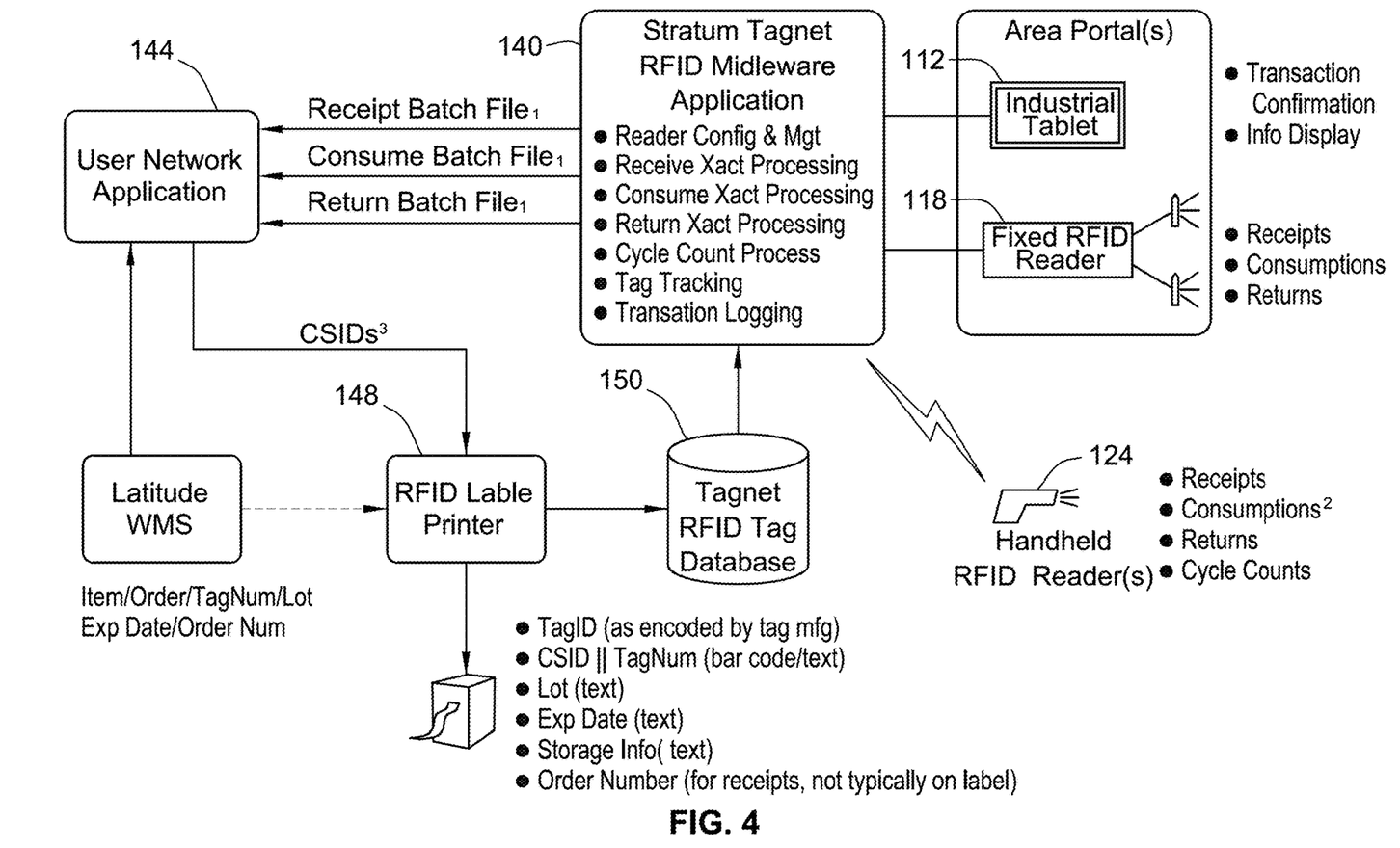
FIG. 4 is a schematic block diagram showing a relationship between various components of the inventory management system, according to an embodiment of the invention.

FIG. 4 is a schematic block diagram showing a relationship between various components of the inventory management system, according to an embodiment of the invention. In a particular embodiment, the computer server 102 is configured to include a middleware application 140 which automatically generates replenishment orders for inventory items when an inventory level for the inventory item drops below a threshold level. The middleware application 140 may reside on the computer server 102 or on a separate networked computer 142 (see FIG. 1B).

The middleware application 140 is configured to access the real-time inventory data stored on the computer server 102. The middleware application 140 is also configured to access enterprise systems 144 (see FIG. 1B) having applications, such as ERP software, capable of placing electronic orders for material acquisition. In some embodiments, users with thin clients 112 or handheld RFID scanners are able to access and use the middleware application 140.

In an embodiment, the middleware application 140 is coupled to an RFID label printer 148, which can access an RFID tag database 150 to obtain the data needed for printing the labels. When the RFID labels are printed, they are typically given a default location (e.g., staging). The labels could remain in that state until received at the user location with no outbound RFID tracking whatsoever. Optionally, the computer server 102, in convert with an RFID portal, can be configured to track the time when an order is loaded for shipment, changing its state from "staging" to "in-transit". An inventory record will be generated for each tagged inventory item, uniquely identified by an identification number, and associated with its default location including the usage state, expiration date, storage information and order number.

The computer server 102 may track the expiration date and the shelf life according to the times for which the inventory item was scanned at the user's RFID portal. Thus, the computer server 102 can issue alerts for the user when the shelf life of an inventory item nears (e.g., is within a predetermined number of days of the expiration date) or exceeds its expiration date.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An inventory management system comprising:
one or more radio frequency identification (RFID) readers each configured to detect RFID labels attached to inventory items within a certain radius of the RFID reader, wherein the one or more RFID readers include one or more handheld RFID readers, or the one or more RFID readers are installed in an RFID portal;
a first computer server configured to communicate, via a network connection using wired or wireless means, with one or more client devices, and configured to receive data, via wired or wireless means, gathered by the one or more RFID readers;
wherein the first computer server includes a database for the storage of inventory information, wherein the computer server is configured to maintain a real-time inventory status of the inventory items, the real-time inventory status including a location of the one or more RFID labels, and further including a current usage state of the attached inventory items; and
wherein the first computer server is configured to transmit the real-time inventory status to a display of the client device.

2. The inventory management system of claim 1, wherein the client device includes a second computer server configured as a slave to the first computer server, the second computer server connected to the one or more RFID readers.

3. The inventory management system of claim 1, wherein the client device includes a handheld RFID scanner.

4. The inventory management system of claim 1, wherein the client device includes a thick-client-managed RFID scanner.

5. The inventory management system of claim 4, wherein the thick client is one of a desktop computer, and a laptop computer.

6. The inventory management system of claim 1, wherein each of the one or more RFID readers is located at a portal or doorway.

7. The inventory management system of claim 6, wherein the portal is a dual zone portal having RFID readers located on each side of the portal.

8. The inventory management system of claim 6, wherein the portal is a single zone portal having RFID readers located on one side of the portal.

9. The inventory management system of claim 8, wherein the first computer server is programmed to implement a dwell time such that, after a change in the current usage state of the inventory item due to detection of the inventory item's RFID label by a particular RFID reader, the current usage state cannot be changed again, during the dwell time, based on a subsequent detection of the inventory item's RFID label by the particular RFID reader.

10. The inventory management system of claim 1, wherein the client devices include an application to facilitate the display the real-time inventory status.

11. The inventory management system of claim 10, wherein the application facilitates the display of a photograph of the inventory item associated with a particular RFID label, along with the location of the RFID label and the current usage state of the inventory item.

12. The inventory management system of claim 11, wherein the application updates the display of the real-time inventory status in real-time based on data gathered by the RFID reader.

13. The inventory management system of claim 1, wherein the first computer server is configured to detect an RFID label carried by an individual in order to identify and record a name of the individual transporting the inventory items.

14. The inventory management system of claim 1, wherein the first computer server is configured to determine the current usage state of inventory items by the directional movement of the RFID labels attached to the inventory items.

15. The inventory management system of claim 1, wherein each location includes a unique RFID label such that a physical count of the inventory items in a location can be performed by scanning the RFID label for the location and for each inventory item in that location.

16. The inventory management system of claim 15, wherein the first computer server is configured to detect, in real time, a discrepancy between the physical count and a projected inventory count.

17. The inventory management system of claim 15, wherein the first computer server loads, onto a handheld RFID scanner for storage thereon, the projected count for the inventory item at the location for comparison to the physical count determined by the handheld RFID scanner.

18. The inventory management system of claim 1, wherein the first computer server is remotely-located from the one or more client devices.

19. The inventory management system of claim 1, wherein the first computer server is configured to maintain a real-time inventory status of the inventory items from one or more remote sites.

20. The inventory Management system of claim 1, wherein the first computer server includes an application which automatically generates replenishment orders for inventory items when an inventory level for the inventory item drops below a threshold level.

21. The inventory management system of claim 1, further comprising an RFID label printer configured to print RFID labels for the inventory items.

22. The inventory management system of claim 1, wherein the first computer server is configured to track a shelf life for each inventory item.

23. The inventory management system of claim 22, wherein the first computer server is configured to track an expiration date for each inventory item, and to alert a user if the shelf life nears or exceeds the expiration date for an inventory item.

24. The inventory management system of claim 1, wherein RFID labels on each inventory item are linked to items listed on the packing slip, and wherein the first computer server is configured to automatically determine whether the RFID labels on each inventory item detected by the one or more RFID readers matches the listing of inventory items on the packing slip.

25. The inventory management system of claim 1, wherein the first computer server is configured to control one or more remotely-located RFID readers.

26. The inventory management system of claim 25, wherein the client device is a thin client used at the remote location to access the real-time inventory status, the thin client comprising one of a tablet computer, touch screen device, notebook computer, and a smart phone.

* * * * *